US009507619B2

(12) United States Patent
Bauman et al.

(10) Patent No.: US 9,507,619 B2
(45) Date of Patent: Nov. 29, 2016

(54) VIRTUALIZING A HOST USB ADAPTER

(75) Inventors: Ellen M. Bauman, Rochester, MN (US); Harvey G. Kiel, Rochester, MN (US); Timothy J. Schimke, Stewartville, MN (US); Lee A. Sendelbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 12/685,842

(22) Filed: Jan. 12, 2010

(65) Prior Publication Data

US 2011/0173353 A1 Jul. 14, 2011

(51) Int. Cl.
G06F 13/28 (2006.01)
G06F 9/455 (2006.01)
G06F 3/00 (2006.01)

(52) U.S. Cl.
CPC . G06F 9/45558 (2013.01); *G06F 2009/45579* (2013.01)

(58) Field of Classification Search
None
See application file for complete search history.

(56) References Cited

U.S. PATENT DOCUMENTS

| 6,636,929 B1 * | 10/2003 | Frantz et al. | 710/313 |
| 8,387,043 B2 | 2/2013 | Tanaka et al. | |
| 2003/0035433 A1 * | 2/2003 | Craddock et al. | 370/429 |
| 2004/0205253 A1 * | 10/2004 | Arndt et al. | 710/1 |
| 2009/0006690 A1 * | 1/2009 | Vembu | G06F 13/10 710/113 |
| 2009/0006702 A1 * | 1/2009 | Sarangdhar et al. | 710/305 |

FOREIGN PATENT DOCUMENTS

JP 2009187368 A 8/2009

OTHER PUBLICATIONS

Noboru Iwamatsu, Development of a Paravirtual USB Driver for Xen, xensummit_tokyo, presentation slides, 2008, pp. 1-10, http://www-archive.xenproject.org/files/xensummit_tokyo/26.
Takahiro Hirofuchi et al., "A Device Access Method over Network by Extending USB Driver Stack of Linux," Research Report of Information Processing Society of Japan, Japan, Incorporated Association, May 9, 2003, vol. 2003, No. 42, pp. 41-48.

* cited by examiner

*Primary Examiner* — Henry Tsai
*Assistant Examiner* — Dean Phan
(74) *Attorney, Agent, or Firm* — Brandon C. Kennedy; Feb Cabrasawan; Kennedy Lenart Spraggins LLP

(57) ABSTRACT

Virtualizing a host USB adapter in a virtualized environment maintained by a hypervisor, the hypervisor administering one or more logical partitions, where virtualizing includes receiving, by the hypervisor from a logical partition via a logical USB adapter, a USB Input/Output ('I/O') request, the logical USB adapter associated with a USB device coupled to the host USB adapter; placing, by the hypervisor, a work queue element ('WQE') in a queue of a queue pair associated with the logical USB adapter; and administering, by an interface device in dependence upon the WQE, USB data communications among the logical partition and the USB device including retrieving, with direct memory access ('DMA'), USB data originating at the USB device from the host USB adapter into a dedicated memory region for the logical USB adapter.

19 Claims, 5 Drawing Sheets

VIRTUALIZING A HOST USB ADAPTER

BACKGROUND OF THE INVENTION

Field of the Invention

The field of the invention is data processing, or, more specifically, methods, apparatus, and products for virtualizing a host Universal Serial Bus ('USB') adapter.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Many peripheral computer components today are coupled for data communications to adapters to in accordance with the Universal Serial Bus specification. USB adapters are inherently point to point communication and are not easily shared between partitions in virtualized environments. Users today require at least one physical USB adapter per partition to connect to USB devices. For a large system comprising many partitions or in a data center this requirement may lead to a large number of physical adapters along with significant additional expense in cost, processing power, computer memory use, and power consumption. These negative factors presented as a result of an increased number of physical adapters are caused in party by the adapters themselves, but also by the enclosures required to provide the associated PCI or PCIe adapter slots.

Virtualizing USB adapters reduces power consumption in USB devices, hubs, adapters and enclosures. Software solutions exist to virtualize USB devices. These solutions use a single shared queue, where USB frames must be sorted, from the single shared queue, to many partitions. This is a very CPU and memory intensive implementation. The single queue solution also has poor performance.

Today's USB devices commonly include keyboards, mouse, speakers and flash drive devices. As USB continues to mature and higher speeds become available, USB is increasingly being used for tape drives, removable hard disk drives, and optical drives. Lack of an efficient, low cost, low power USB virtualization on a partitioned computer system is a significant problem. USB 3.0, which is 10 times faster than USB 2.0, will be utilized by an even broader spectrum of devices. The additional bandwidth allows more devices on the same link at the same time. The industry is moving tape drives and removable hard drives to USB as the preferred attachment. The need for an improved USB virtualized is presently increasing.

SUMMARY OF THE INVENTION

Methods, apparatus, and products for virtualizing a host Universal Serial Bus ('USB') adapter in a virtualized environment maintained by a hypervisor are disclosed. In embodiments of the present invention, the hypervisor administers one or more logical partitions and virtualizing a host USB adapter includes receiving, by the hypervisor from a logical partition via a logical USB adapter, a USB Input/Output ('I/O') request, the logical USB adapter associated with a USB device coupled to the host USB adapter; placing, by the hypervisor, a work queue element ('WQE') in a queue of a queue pair associated with the logical USB adapter; and administering, by an interface device in dependence upon the WQE, USB data communications among the logical partition and the USB device including retrieving, with direct memory access ('DMA'), USB data originating at the USB device from the host USB adapter into a dedicated memory region for the logical USB adapter.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
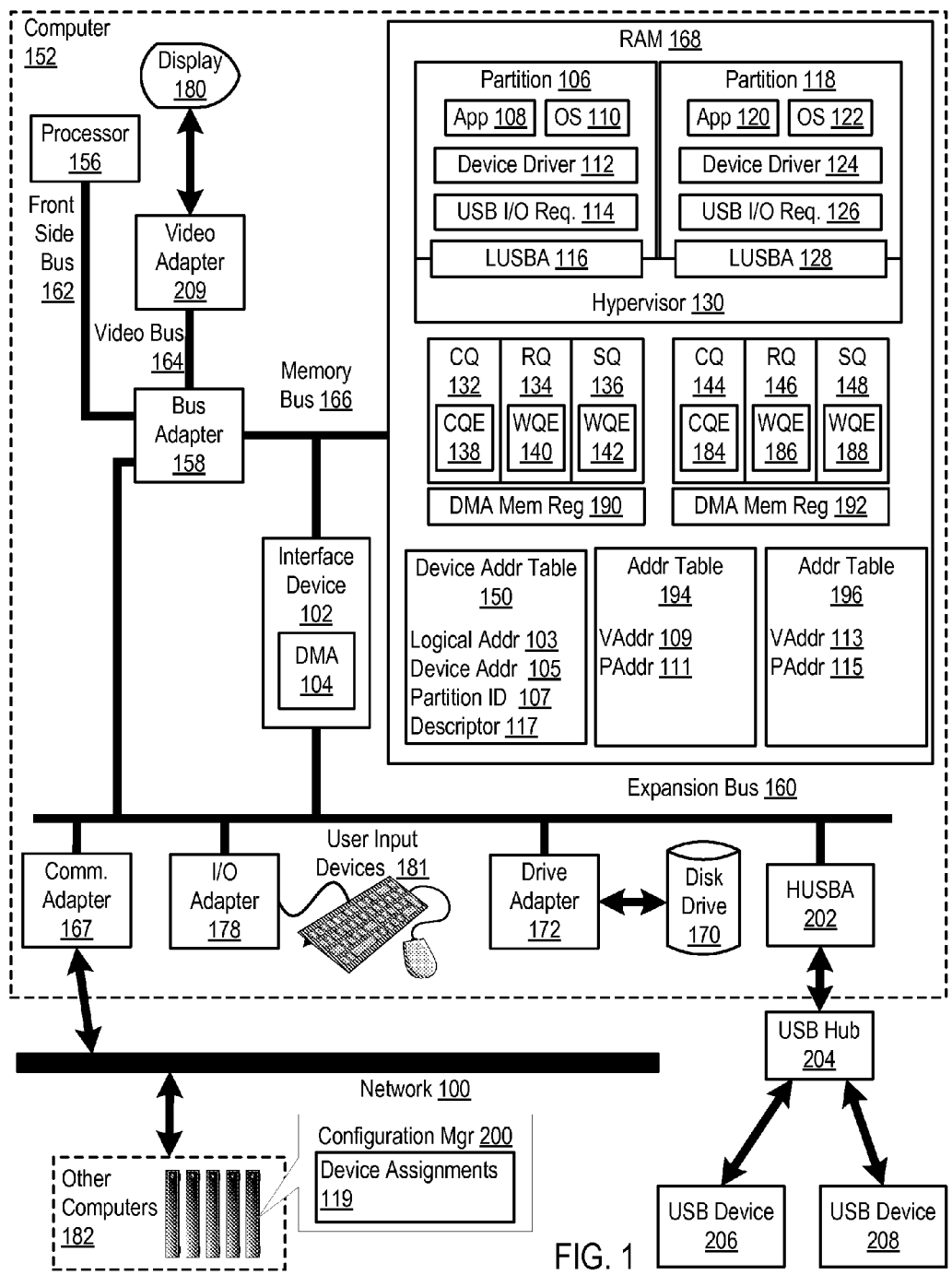
FIG. 1 sets forth a network diagram of an exemplary system for virtualizing a host USB adapter according to embodiments of the present invention.

Exemplary methods, apparatus, and products for virtualizing a host USB adapter in accordance with the present invention are described with reference to the accompanying drawings, beginning with FIG. 1. FIG. 1 sets forth a network diagram of an exemplary system for virtualizing a host USB adapter according to embodiments of the present invention. The system of FIG. 1 includes automated computing machinery comprising an exemplary computer (152) useful in virtualizing a host USB adapter according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a hypervisor (130), a module of automated computing machinery that may comprise any combination of computer program instructions, computer hardware, and so on. The hypervisor (130) in the example of FIG. 1 maintains a virtualized environment. A hypervisor, also called virtual machine monitor ('VMM'), performs software and hardware platform-virtualization in order to enable multiple operating systems to run on a host computer concurrently. A hypervisor runs directly on the host's hardware to control hardware access and to monitor guest operating-systems. A guest operating system runs on a level above the hypervisor. The platform virtualization provided by a hypervisor is referred to in this specification as a virtualized environment. A virtualized environment is one in which physical characteristics of a computing platform—computer processors, computer memory, I/O adapters, and the like—are abstracted from the perspective of an operating system and other software applications.

In the example of FIG. 1, the hypervisor (130) maintains a virtualized environment that includes two logical partitions (106, 118). A logical partition as the term is used here is a unique virtual machine provided by the hypervisor within which an operating system and other applications may execute. Each logical partition (106, 118) includes an application (108, 120) and an operating system (110, 122). An application (108, 120) is a module of computer program instructions capable of carrying out user level data processing tasks. Examples of such applications include word processing applications, spreadsheet applications, web server applications, database management applications, media library applications, media playback applications, media transcoding applications, and so on as will occur to readers of skill in the art. Operating systems useful in systems that virtualize a host USB adapter according to embodiments of the present invention include UNIX™, Linux™, Microsoft XP™, AIX™, IBM's i5/OS™, and others as will occur to those of skill in the art.

The hypervisor (130) in the example of FIG. 1 also operates generally for virtualizing a host USB adapter (202) according to embodiments of the present invention. USB is specification to establish communication between devices and a host controller. USB can connect computer peripherals such as mice, keyboards, digital cameras, printers, personal media players, flash drives, and external hard drives. For many of those devices, USB has become the standard connection method. USB was designed for personal computers, but it has become commonplace on other devices such as smartphones, personal digital assistants (PDAs) and video game consoles, and as a power cord between a device and an AC adapter plugged into a wall plug for battery charging. The design of USB is standardized by the USB Implementers Forum (USB-IF), an industry standards body incorporating leading companies from the computer and electronics industries.

USB devices are coupled to a host computer system through a host USB adapter. In the example of FIG. 1, the host USB adapter (202) is coupled to two USB devices (206, 208) through a USB hub (204). A USB hub is a device that enables many USB devices to be connected to a single USB port on a host computer or another hub.

The hypervisor (130) may virtualize the host USB adapter (202) by initiating USB device discovery of USB devices (206, 208) coupled to the host USB adapter (202). Initiating USB device discovery of the USB devices (206, 208) may include assigning each discovered USB device a physical device address (105) and retrieving from each discovered USB device a device descriptor (117) that includes information describing the USB device. A device descriptor (117) may include, for example, a device class of the USB device, a vendor identifier of the USB device, a product identifier of the USB device, and a serial number of the USB device.

Assignment of physical device addresses (105) may be carried out in a typical fashion as defined by the USB specification including, probing the USB fabric using a default target address, programming each device identified during the probe with a control transfer to assign a physical device address to the USB device. The hypervisor (130) may generate, during the probe of devices, a data structure, such as a table, list, or logical tree, indicated currently discovered USB devices. The hypervisor (130) may, for example, generate a table (not shown) that includes associations among physical device addresses (105) and device descriptors (117).

The hypervisor (130) may also receive, from a configuration manager (200), assignments (119) of each discovered USB device to one or more logical partitions. A configuration manager is a module of automated computing machinery that provides to users a configuration mechanism for the computer (152) of FIG. 1. The configuration manager (200) may, for example, present a graphical user interface ('GUI') through which user input may be captured. Such a GUI may enable a user to configure various components of the computer (152) of FIG. 1 including for example, assignments of USB devices (206, 208) to logical partitions (106, 118). The configuration manager (200) in the example of FIG. 1 may specify assignments (118) of each discovered USB device to one or more logical partitions responsive to user input received by the GUI. The hypervisor (130), responsive to receiving such assignments (119) may generate a data structure representing the assignments such as the example device address table (150) of FIG. 1 which includes associations of physical device addresses (105), to logical device addresses (103), partition identifiers (107) and device descriptors (117). The configuration manager (200) may also inform the hypervisor of USB devices not previously discovered during USB device discovery. Such a device may be presently powered off to reserve power, out for repair, or the like.

The hypervisor (130) may establish a queue pair (134 & 136, 146 & 148) for each USB device (206, 208) assigned to a logical partition (106, 118). Furthermore, the hypervisor presents a separate logical USB adapter (116, 128) for each USB device assigned to a partition. For example, for a logical partition assigned three devices, the hypervisor may establish three queue pairs and may present three separate logical USB adapters to the logical partition. A logical USB adapter is a module of automated computing machinery presented to a logical partition (106) as a means for performing USB data communications, where the logical USB adapter is associated with a particular USB device coupled to the host USB adapter (202). A logical USB adapter is an abstraction, from the perspective of a partition, of a host USB adapter (202). In the system of FIG. 1, from the perspective of an operating system in a logical partition, each USB device assigned to the logical partition is coupled directly to a different host USB adapter—the logical USB adapter—when, in actuality, only one hardware USB adapter (202) is present. One USB device may be assigned to more than one logical partition. For each logical partition to which the USB device is assigned, the hypervisor establishes a separate queue pair and presents a logical USB adapter to the partition.

In addition to and after establishing, a queue pair for each USB device assigned to a logical partition, the hypervisor may provide for each USB device assigned to a logical partition an indication of the presence of the USB device. Upon such an indication, the operating system (110, 122) of the partition (106, 118) may then load a device driver (112, 124) for the USB device.

The hypervisor may also virtualize the host USB adapter (202) of FIG. 1 by receiving, from a logical partition (106, 118) via a logical USB adapter (116, 128), a USB Input/Output ('I/O') request (114, 126). Each logical USB adapter (116, 128) is associated with a USB device (206, 208) coupled to the host USB adapter (204). The hypervisor (130) may receive a USB I/O request (114, 126) by receiving library function calls to functions made available by the hypervisor to each partition, more specifically, the device driver (112, 124) may execute one or more hypervisor function calls, passing as arguments to the function calls payload data of the USB I/O request, such as a virtual address range defining a memory region to store USB data received from a USB device, a logical device address identifying a USB device, and a type of I/O to perform.

The hypervisor may register a dedicated memory region (190, 192) in dependence upon the virtual address range specified in the USB I/O request (114, 126). The hypervisor may register the dedicated memory region (190, 192) by pinning a physical memory segment from memory paging and mapping the virtual address range to the physical memory segment. Such mapping of the virtual address range (109, 113) to the physical address range (111, 115) may be stored in a separate data structure for each partition (106, 118), such as, for example, in an address table (194, 196).

The hypervisor (130) may also place a work queue element ('WQE') in a queue (134, 136, 146, 148) of a queue pair associated with the logical USB adapter (116, 128). A queue pair is a set of two queues that provide a transmit/receive or send/receive facility for the virtualized host USB adapter. A queue pair may be implemented in a manner similar to the queue pairs implemented with a Host Ethernet Adapter or in the Infiniband™ technologies. In placing a WQE in a queue of a queue pair, the hypervisor may, translate a logical device address (103) of the USB device (206, 208) included in the USB I/O request (114, 126) to a physical device address (105) of the USB device (206, 208). A WQE is an element that defines a particular operation such as a send or receive command to be carried out via USB data communications. A send WQE may be placed in the send queue of the queue pair, and a receive WQE may be placed in the receive queue of a queue pair. A WQE may specify a transfer type, the physical device address of the USB device, an endpoint identifier; and a descriptor list including a specification of the virtual address range of the dedicated memory region. A transfer type is describes a type of data communications transfer to carry out such as a bulk transfer, interrupt type transfer, Isochronous transfer, or control transfer. An endpoint identifier is an identifier of an interface exposed by a communicating party, the USB device.

In addition to the send queue and receive queue of each queue pair, each logical USB adapter (116, 128) is also associated with a completion queue (132, 144). A completion queue (132, 144) is configured to store elements, completion queue elements, that indicate a completion of a WQE. Stored in the completion queue (132, 144) is a completion queue element ('CQE') (138, 184).

The computer of FIG. 1 also includes an interface device (102). The interface device (102) of FIG. 1 comprises automated computing machinery configured to administer, in dependence upon the WQE, USB data communications among the logical partition and the USB device. The interface device (102) in the example of FIG. 1 also includes a direct memory access ('DMA') engine (104). In administering USB data communications, the interface device (102) may retrieve, with DMA, USB data originating at the USB device (206, 208) from the host USB adapter (202) into a dedicated memory region (190, 192) for the logical USB adapter (116, 128). DMA is a feature of modern computers and microprocessors that allows hardware subsystems within the computer to access system memory for reading and writing independently of the central processing unit. Many hardware systems use DMA including disk drive controllers, graphics cards, network cards, and sound cards. DMA is also used for intra-chip data transfer in multi-core processors, especially in multiprocessor system-on-chips, where its processing element is equipped with a local memory (often called scratchpad memory) and DMA is used for transferring data between the local memory and the main memory. Computers that have DMA channels can transfer data to and from devices with much less CPU overhead than computers without a DMA channel. Similarly a processing element inside a multi-core processor can transfer data to and from its local memory without occupying its processor time and allowing computation and data transfer concurrency.

The interface device performs USB frame routing of incoming data received by the host USB adapter in dependence upon the physical device address and a packet identifier ('PID'). A PID in a USB frame identifies a type of the USB frame. Example PIDs include SPLIT, PING, PRE, ERR, ACK, NACK NYET, STALL, OUT, IN, SOF, SETUP, DATA0, DATA1, DATA2, MDATA, and the like. The PID and device address may be used to by the interface device to identify the associated WQE and the virtual address range of the dedicated memory from the WQE. The interface device may use the virtual address range included in the WQE along with the address table (194, 196) to translate the virtual address into the physical address and DMA directly into that physical address range.

The logical partitions (106, 118), applications (108, 120), operating systems (110, 122), device drivers (112, 124), USB I/O requests (114, 126), logical USB adapters (1160, 128), hypervisor (130), queue pairs (134 &136, 146 and 148) other data, data structures, and modules of computer program instructions in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for virtualizing a host USB adapter according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for virtualizing a host USB adapter according to embodiments of the present invention include modems for wired dial-up communications, Ethernet (IEEE 802.3) adapters for wired data communications network communications, and 802.11 adapters for wireless data communications network communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
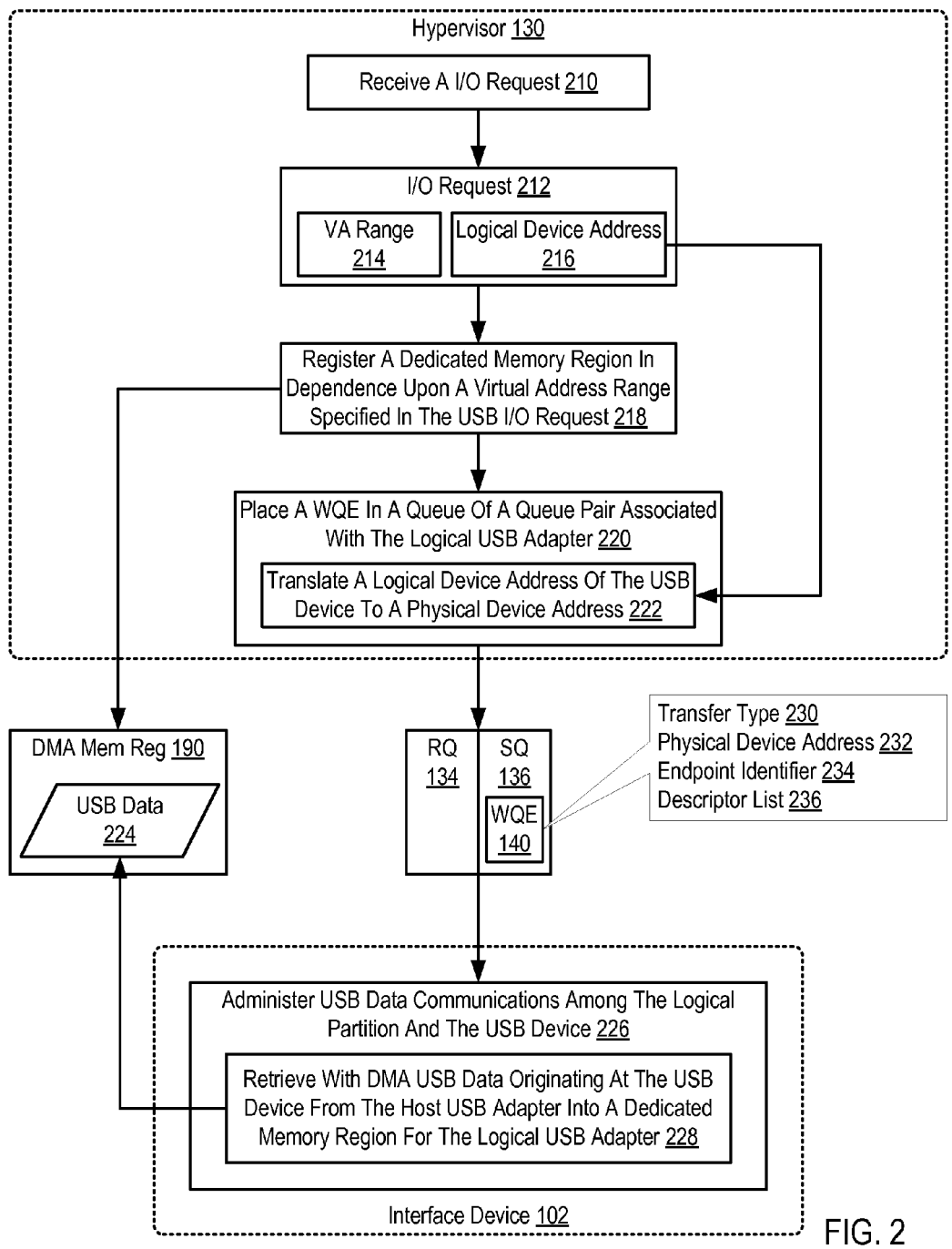
FIG. 2 sets forth a flow chart illustrating an exemplary method for virtualizing a host USB adapter according to embodiments of the present invention.

For further explanation, FIG. 2 sets forth a flow chart illustrating an exemplary method for virtualizing a host USB adapter according to embodiments of the present invention. The method of FIG. 2 is carried out in a virtualized environment maintained by a hypervisor (130) that administers one or more logical partitions (106, 118 on FIG. 1).

The method of FIG. 2 includes receiving (210), by the hypervisor (130) from a logical partition via a logical USB adapter, a USB I/O request (212). In the method of FIG. 2, the logical USB adapter associated with a USB device coupled to the host USB adapter. Also in the method of FIG. 2, the USB I/O request (212) includes a virtual address range (214) specifying a memory region to register and a logical device address identifying the USB device.

The method of FIG. 2 also includes registering (218) the dedicated memory region (190) in dependence upon the virtual address range (214) specified in the USB I/O request (212). As mentioned above, the hypervisor may register (218) the dedicated memory region (190) by pinning the memory region from paging and storing a virtual address to physical address mapping for later use by an interface device when performing DMA transfers.

The method of FIG. 2 also includes placing (220), by the hypervisor (130), a WQE (140) in a queue (136) of a queue pair (134, 136) associated with the logical USB adapter. In the method of FIG. 2, placing (220) a WQE (140) in a queue (136) is includes translating (222) a logical device address (216) of the USB device included in the USB I/O request (218) to a physical device address (232) of the USB device. In the method of FIG. 2, the WQE (140) includes a transfer type (230), the physical device address (232) of the USB device, an endpoint identifier (234), and a descriptor list (236) including a specification of the virtual address range (214) of the dedicated memory region (190).

The method of FIG. 2 also includes administering (226), by an interface device (102) in dependence upon the WQE (140), USB data communications among the logical partition and the USB device. In the method of FIG. 2, administering (226) USB data communications is carried out by retrieving (228), with DMA, USB data (224) originating at the USB device from the host USB adapter into a dedicated memory region (190) for the logical USB adapter.

Figure 3:
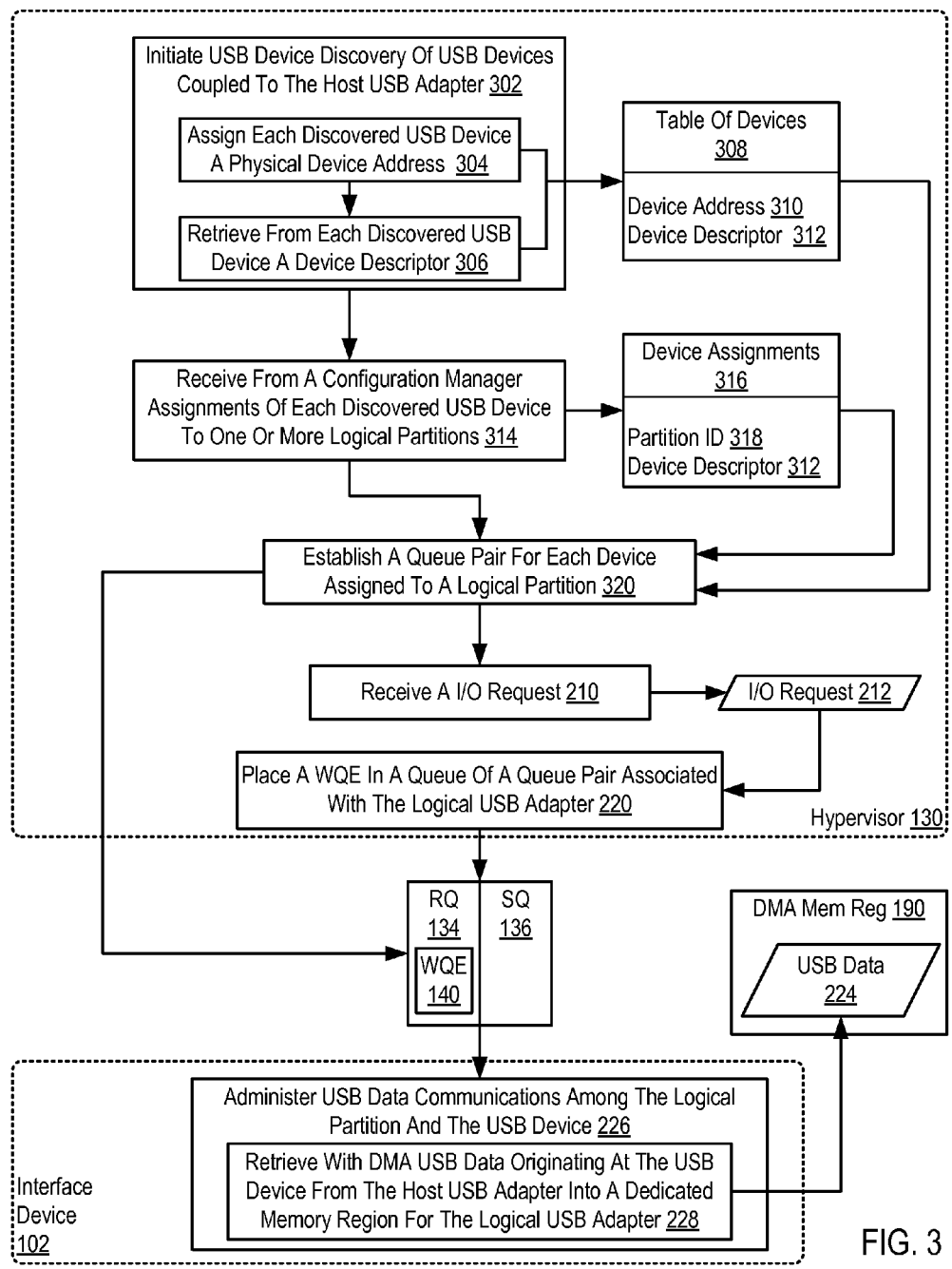
FIG. 3 sets forth a flow chart illustrating a further exemplary method for virtualizing a host USB adapter according to embodiments of the present invention.

For further explanation, FIG. 3 sets forth a flow chart illustrating a further exemplary method for virtualizing a host USB adapter according to embodiments of the present invention. The method of FIG. 3 is similar to the method of FIG. 2 in that the method of FIG. 3 is carried out in a virtualized environment maintained by a hypervisor (130) that administers one or more logical partitions (106, 118 on FIG. 1). The method of FIG. 3 is also similar to the method of FIG. 2 in that the method of FIG. 3 includes receiving (210) a USB I/O request (212), placing (220) a WQE (140) in a queue (136) of a queue pair (134, 136) associated with the logical USB adapter, and administering (226) USB data communications among the logical partition and the USB device by retrieving (228), with DMA, USB data (224) from the host USB adapter into a dedicated memory region (190) for the logical USB adapter.

The method of FIG. 3 differs from the method of FIG. 2, however, in that the method of FIG. 3 also includes initiating (302), by the hypervisor (130), USB device discovery of USB devices coupled to the host USB adapter. In the method of FIG. 2, initiating (302) USB device discovery of USB devices coupled to the host USB adapter is carried out by assigning (304) each discovered USB device a physical device address (310) and retrieving (306) from each discovered USB device a device descriptor (312) that includes information describing the USB device. The hypervisor may generate a table of presently discovered USB devices (308) that includes the physical device address (310) and the device descriptor (312) of each discovered device.

The method of FIG. 3 also includes receiving (314), by the hypervisor (130) from a configuration manager, assignments (316) of each discovered USB device to one or more logical partitions (318). The method of FIG. 3 also includes establishing (320), by the hypervisor (130), a queue pair (134, 136) for each USB device assigned to a logical partition.

Figure 4:
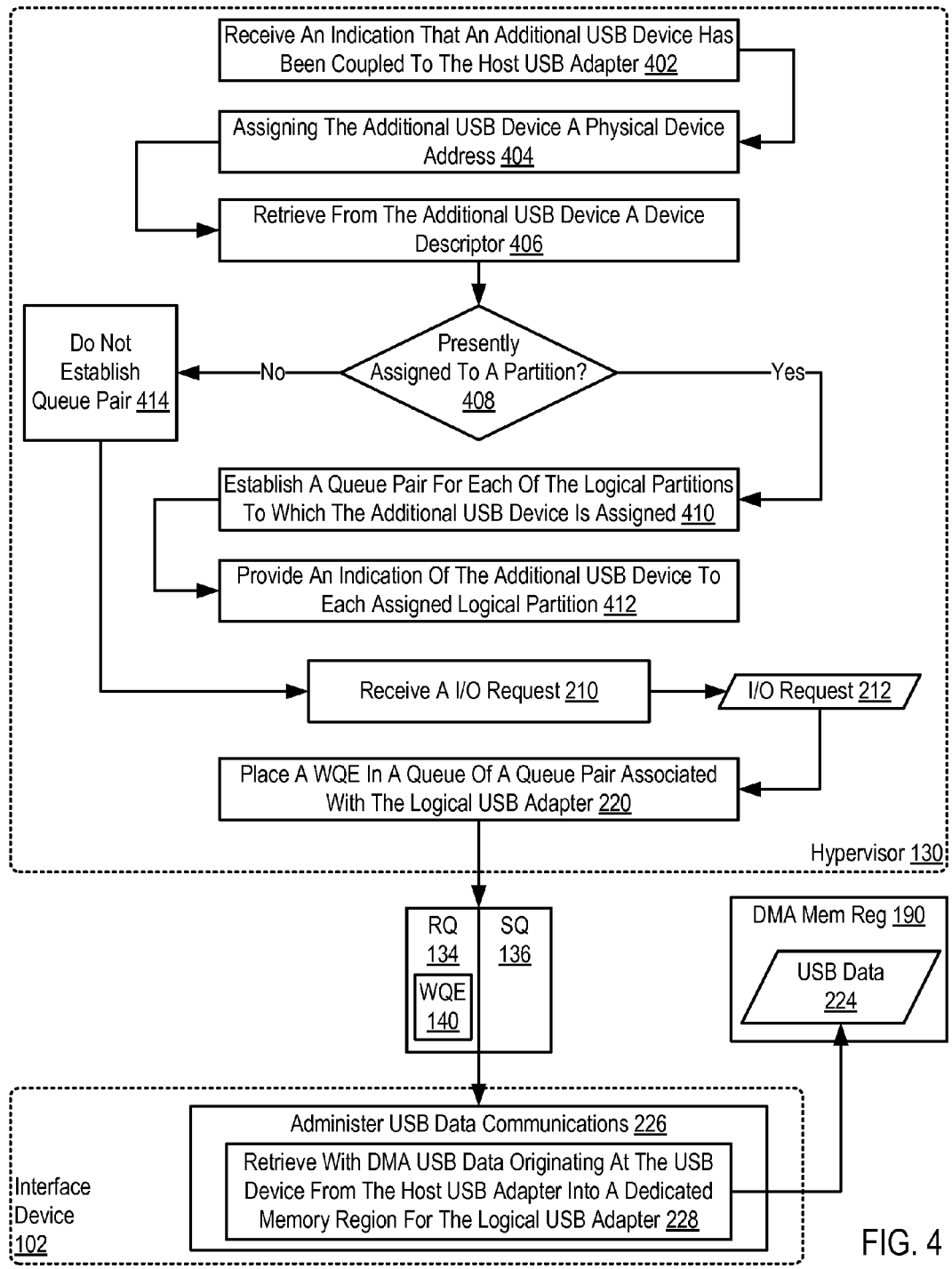
FIG. 4 sets forth a flow chart illustrating a further exemplary method for virtualizing a host USB adapter according to embodiments of the present invention.

For further explanation, FIG. 4 sets forth a flow chart illustrating a further exemplary method for virtualizing a host USB adapter according to embodiments of the present invention. The method of FIG. 4 is similar to the method of FIG. 2 in that the method of FIG. 4 is carried out in a virtualized environment maintained by a hypervisor (130) that administers one or more logical partitions (106, 118 on FIG. 1). The method of FIG. 4 is also similar to the method of FIG. 2 in that the method of FIG. 4 includes receiving (210) a USB I/O request (212), placing (220) a WQE (140) in a queue (136) of a queue pair (134, 136) associated with the logical USB adapter, and administering (226) USB data communications among the logical partition and the USB device by retrieving (228), with DMA, USB data (224) from the host USB adapter into a dedicated memory region (190) for the logical USB adapter.

The method of FIG. 4 differs from the method of FIG. 2, however, in that the method of FIG. 4 also includes receiving (402), by the hypervisor, an indication that an additional USB device has been coupled to the host USB adapter. Receiving (402), by the hypervisor, an indication that an additional USB device has been coupled to the host USB adapter may be carried out in various ways including, for example, by receiving a hardware interrupt raised upon connection of the additional USB device to a downstream USB hub or the host USB adapter.

The method of FIG. 4 also includes assigning (404), by the hypervisor (130), the additional USB device a physical device address, retrieving (406), by the hypervisor (130) from the additional USB device, a device descriptor that includes information describing the additional USB device, and determining (408), by the hypervisor (130) from information provided by a configuration manager, whether the additional USB device is presently assigned to a logical partition. Determining (408) whether the additional USB device is presently assigned to a logical partition may be carried out by inspecting the table (316) of device assignments for the device descriptor or portion of the device descriptor (312), such as the serial number, of the additional USB device and any associated partition identifier (318).

If the additional USB device is not presently assigned to one or more logical partitions, the method of FIG. 4 continues by not establishing (414), by the hypervisor (130), a queue pair for the USB device. If the additional USB device is presently assigned to one or more logical partitions, the method of FIG. 4 continues by establishing (410), by the hypervisor (130), a queue pair (134, 136) for each of the logical partitions to which the additional USB device is assigned.

The method of FIG. 4 also includes providing (412), by the hypervisor (130) to each logical partition to which the additional USB device is assigned, an indication of the additional USB device. The hypervisor may provide (412), to each logical partition to which the additional USB device is assigned, an indication of the additional USB device by raising a software interrupt in the partitions operating system designated for such a purpose, or in other ways as will occur to readers of skill in the art.

Figure 5:
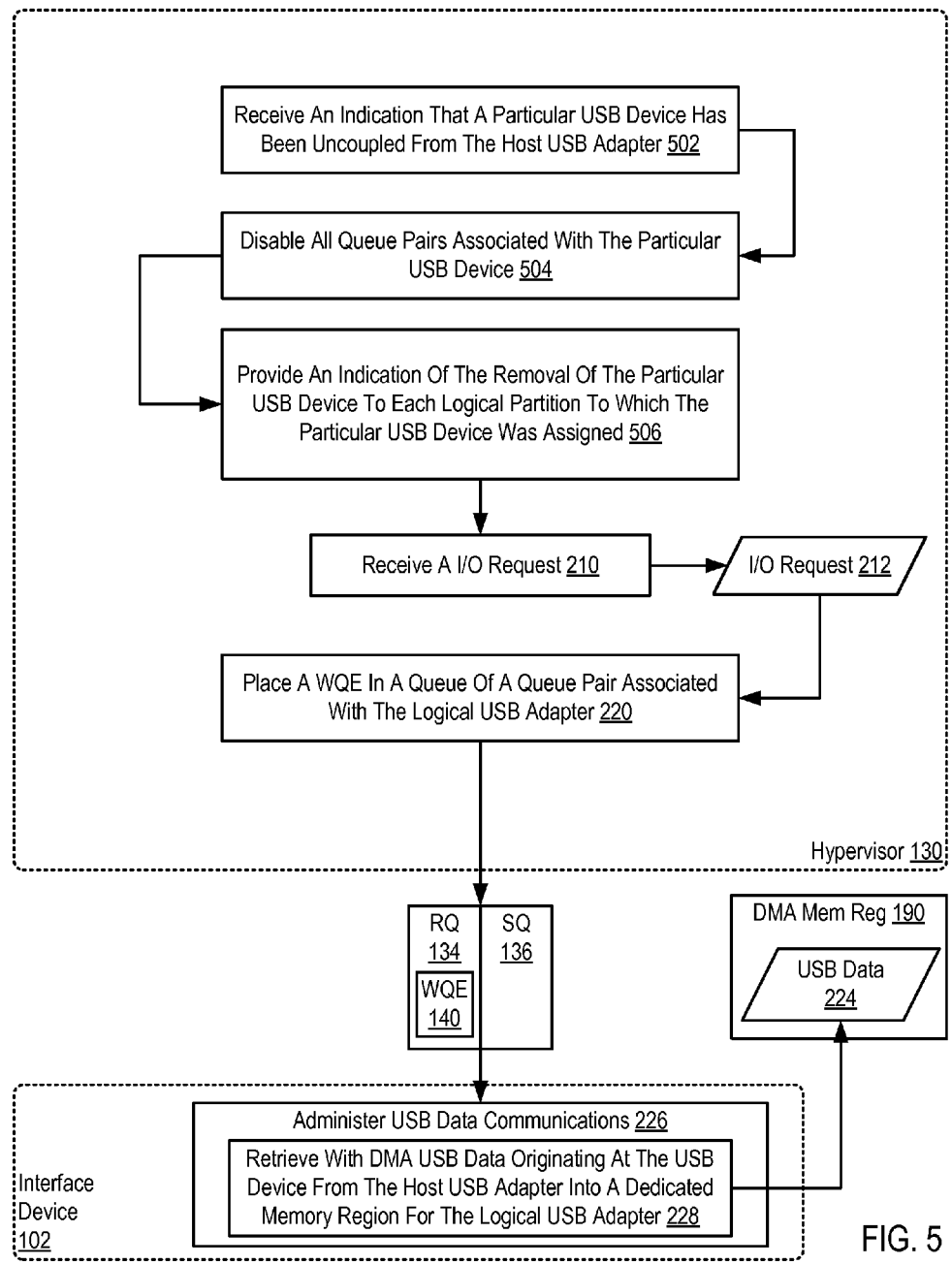
FIG. 5 sets forth a flow chart illustrating a further exemplary method for virtualizing a host USB adapter according to embodiments of the present invention.

For further explanation, FIG. 5 sets forth a flow chart illustrating a further exemplary method for virtualizing a host USB adapter according to embodiments of the present invention. The method of FIG. 5 is similar to the method of FIG. 2 in that the method of FIG. 5 is carried out in a virtualized environment maintained by a hypervisor (130) that administers one or more logical partitions (106, 118 on FIG. 1). The method of FIG. 5 is also similar to the method of FIG. 2 in that the method of FIG. 5 includes receiving (210) a USB I/O request (212), placing (220) a WQE (140) in a queue (136) of a queue pair (134, 136) associated with the logical USB adapter, and administering (226) USB data communications among the logical partition and the USB device by retrieving (228), with DMA, USB data (224) from the host USB adapter into a dedicated memory region (190) for the logical USB adapter.

The method of FIG. 5 differs from the method of FIG. 2, however, in that the method of FIG. 5 also includes receiving (502), by the hypervisor (130), an indication that a particular USB device has been uncoupled from the host USB adapter; disabling (504), by the hypervisor (130), all queue pairs associated with the particular USB device; and providing (506), by the hypervisor (130) to each logical partition to which the particular USB device was assigned, an indication of the removal of the particular USB device.

In view of the explanations set forth above, readers will recognize that the benefits of virtualizing a host USB adapter according to embodiments of the present invention include:
  One piece of physical hardware is shared by many partitions. The customer does not have to buy separate adapters for each logical partition to achieve USB connectivity. This saves both the cost of the adapter and the enclosure, cabling, and other physical attributes of an adapter.
  No coordination between device drivers or partitions is required.
  Full hardware isolation and protection is provided. No partition is able to corrupt another partition through the virtualized USB hardware, even if the partition is ill-behaving.
  No changes to existing USB infrastructure are required to employ virtualization in accordance with embodiments of the present invention. Embodiments may be fully interoperable with standard off the shelf components and management software.
  The USB adapter appears to a network as a normal Host USB adapter.
  Logical USB adapters provide for a zero copy write/read just like well-implemented USB adapters, so there is limited to no performance penalty associated with using a logical USB adapter.
  Significant power saving may be provided by a reduced number adapters, enclosures of adapters, and USB devices.
  Significant CPU processing power and memory may be saved virtualizing the USB adapter.
  Current operating system device drivers for USB may operate unchanged with USB host adapters virtualized in accordance with embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of virtualizing a host Universal Serial Bus ('USB') adapter in a virtualized environment maintained by a hypervisor, the hypervisor administering one or more logical partitions, the method comprising:
    establishing, by the hypervisor, for each logical partition, a queue pair for each USB device assigned to the logical partition;
    presenting a first logical USB adapter and a second logical USB adapter to a logical partition, wherein each logical USB adapter is associated with a USB device coupled to the host USB adapter;
    receiving, by the hypervisor from the logical partition via the first logical USB adapter, a USB Input/Output ('I/O') request;
    placing, by the hypervisor, a work queue element ('WQE') in a queue of a queue pair associated with the first logical USB adapter;
    administering, by an interface device in dependence upon the WQE, USB data communications among the logical partition and the USB device including retrieving, with direct memory access ('DMA'), USB data originating at the USB device from the host USB adapter into a dedicated memory region for the first logical USB adapter;
    determining, by the hypervisor from information provided by a configuration manager, whether an additional USB device is presently assigned to a logical partition; and
    if the additional USB device is not presently assigned to one or more logical partitions, not establishing, by the hypervisor, a queue pair for any of the one or more logical partitions.

2. The method of claim 1 further comprising:
    registering the dedicated memory region in dependence upon a virtual address range specified in the USB I/O request, wherein:
    placing a WQE in a queue of a queue pair associated with the first logical USB adapter further comprises translating a logical device address of the USB device included in the USB I/O request to a physical device address of the USB device;
    the WQE further comprises a transfer type, the physical device address of the USB device, an endpoint identifier; and a descriptor list including a specification of the virtual address range of the dedicated memory region.

3. The method of claim 1 further comprising initiating, by the hypervisor, USB device discovery of USB devices coupled to the host USB adapter, including assigning each discovered USB device a physical device address and retrieving from each discovered USB device a device descriptor that includes information describing the USB device.

4. The method of claim 3 further comprising:
receiving, by the hypervisor from a configuration manager, assignments of each discovered USB device to one or more logical partitions.

5. The method of claim 1 further comprising:
receiving, by the hypervisor, an indication that the additional USB device has been coupled to the host USB adapter;
assigning, by the hypervisor, the additional USB device a physical device address;
retrieving, by the hypervisor from the additional USB device, a device descriptor that includes information describing the additional USB device;
if the additional USB device is presently assigned to one or more logical partitions, establishing, by the hypervisor, a queue pair for each of the logical partitions to which the additional USB device is assigned; and
providing, by the hypervisor to each logical partition to which the additional USB device is assigned, an indication of the additional USB device.

6. The method of claim 1 further comprising:
receiving, by the hypervisor, an indication that a particular USB device has been uncoupled from the host USB adapter;
disabling, by the hypervisor, all queue pairs associated with the particular USB device; and
providing, by the hypervisor to each logical partition to which the particular USB device was assigned, an indication of the removal of the particular USB device.

7. An apparatus for virtualizing a host Universal Serial Bus ('USB') adapter in a virtualized environment maintained by a hypervisor, the hypervisor administering one or more logical partitions, the apparatus comprising a computer processor, a computer memory operatively coupled to the computer processor, the computer memory having disposed within it computer program instructions that when executed by the computer processor cause the apparatus to carry out the steps of:
establishing, by the hypervisor, for each logical partition, a queue pair for each USB device assigned to the logical partition;
presenting a first logical USB adapter and a second logical USB adapter to a logical partition, wherein each logical USB adapter is associated with a USB device coupled to the host USB adapter;
receiving, by the hypervisor from the logical partition via the first logical USB adapter, a USB Input/Output ('I/O') request;
placing, by the hypervisor, a work queue element ('WQE') in a queue of a queue pair associated with the first logical USB adapter;
administering, by an interface device in dependence upon the WQE, USB data communications among the logical partition and the USB device including retrieving, with direct memory access ('DMA'), USB data originating at the USB device from the host USB adapter into a dedicated memory region for the first logical USB adapter;
determining, by the hypervisor from information provided by a configuration manager, whether an additional USB device is presently assigned to a logical partition; and if the additional USB device is not presently assigned to one or more logical partitions, not establishing, by the hypervisor, a queue pair for any of the one or more logical partitions.

8. The apparatus of claim 7 further comprising computer program instructions that when executed by the computer processor cause the apparatus to carry out the steps of:
registering the dedicated memory region in dependence upon a virtual address range specified in the USB I/O request, wherein:
placing a WQE in a queue of a queue pair associated with the first logical USB adapter further comprises translating a logical device address of the USB device included in the USB I/O request to a physical device address of the USB device;
the WQE further comprises a transfer type, the physical device address of the USB device, an endpoint identifier; and a descriptor list including a specification of the virtual address range of the dedicated memory region.

9. The apparatus of claim 7 further comprising computer program instructions that when executed by the computer processor cause the apparatus to carry out the steps of:
initiating, by the hypervisor, USB device discovery of USB devices coupled to the host USB adapter, including assigning each discovered USB device a physical device address and retrieving from each discovered USB device a device descriptor that includes information describing the USB device.

10. The apparatus of claim 9 further comprising computer program instructions that when executed by the computer processor cause the apparatus to carry out the steps of:
receiving, by the hypervisor from a configuration manager, assignments of each discovered USB device to one or more logical partitions.

11. The apparatus of claim 7 further comprising computer program instructions that when executed by the computer processor cause the apparatus to carry out the steps of:
receiving, by the hypervisor, an indication that the additional USB device has been coupled to the host USB adapter;
assigning, by the hypervisor, the additional USB device a physical device address;
retrieving, by the hypervisor from the additional USB device, a device descriptor that includes information describing the additional USB device;
if the additional USB device is presently assigned to one or more logical partitions, establishing, by the hypervisor, a queue pair for each of the logical partitions to which the additional USB device is assigned; and
providing, by the hypervisor to each logical partition to which the additional USB device is assigned, an indication of the additional USB device.

12. The apparatus of claim 7 further comprising computer program instructions that when executed by the computer processor cause the apparatus to carry out the steps of:
receiving, by the hypervisor, an indication that a particular USB device has been uncoupled from the host USB adapter;
disabling, by the hypervisor, all queue pairs associated with the particular USB device; and
providing, by the hypervisor to each logical partition to which the particular USB device was assigned, an indication of the removal of the particular USB device.

13. A computer program product for virtualizing a host Universal Serial Bus ('USB') adapter in a virtualized environment maintained by a hypervisor, the hypervisor administering one or more logical partitions, the computer program product disposed in a computer readable storage medium, the computer program product comprising computer program instructions that when executed by a computer cause the computer to carry out the steps of:

establishing, by the hypervisor, for each logical partition, a queue pair for each USB device assigned to the logical partition;

presenting a first logical USB adapter and a second logical USB adapter to a logical partition, wherein each logical USB adapter is associated with a USB device coupled to the host USB adapter;

receiving, by the hypervisor from the logical partition via the first logical USB adapter, a USB Input/Output ('I/O') request;

placing, by the hypervisor, a work queue element ('WQE') in a queue of a queue pair associated with the first logical USB adapter; and administering, by an interface device in dependence upon the WQE, USB data communications among the logical partition and the USB device including retrieving, with direct memory access ('DMA'), USB data originating at the USB device from the host USB adapter into a dedicated memory region for the first logical USB adapter;

determining, by the hypervisor from information provided by a configuration manager, whether an additional USB device is presently assigned to a logical partition; and if the additional USB device is not presently assigned to one or more logical partitions, not establishing, by the hypervisor, a queue pair for any of the one or more logical partitions.

14. The computer program product of claim 13 further comprising computer program instructions that when executed by a computer cause the computer to carry out the steps of:

registering the dedicated memory region in dependence upon a virtual address range specified in the USB I/O request, wherein:

placing a WQE in a queue of a queue pair associated with the first logical USB adapter further comprises translating a logical device address of the USB device included in the USB I/O request to a physical device address of the USB device;

the WQE further comprises a transfer type, the physical device address of the USB device, an endpoint identifier; and a descriptor list including a specification of the virtual address range of the dedicated memory region.

15. The computer program product of claim 13 further comprising computer program instructions that when executed by a computer cause the computer to carry out the steps of: initiating, by the hypervisor, USB device discovery of USB devices coupled to the host USB adapter, including assigning each discovered USB device a physical device address and retrieving from each discovered USB device a device descriptor that includes information describing the USB device.

16. The computer program product of claim 15 further comprising computer program instructions that when executed cause a computer to carry out the steps of:

receiving, by the hypervisor from a configuration manager, assignments of each discovered USB device to one or more logical partitions.

17. The computer program product of claim 13 further comprising computer program instructions that when executed by a computer cause the computer to carry out the steps of:

receiving, by the hypervisor, an indication that the additional USB device has been coupled to the host USB adapter;

assigning, by the hypervisor, the additional USB device a physical device address;

retrieving, by the hypervisor from the additional USB device, a device descriptor that includes information describing the additional USB device;

if the additional USB device is presently assigned to one or more logical partitions, establishing, by the hypervisor, a queue pair for each of the logical partitions to which the additional USB device is assigned; and providing, by the hypervisor to each logical partition to which the additional USB device is assigned, an indication of the additional USB device.

18. The computer program product of claim 13 further comprising computer program instructions that when executed by a computer cause the computer to carry out the steps of:

receiving, by the hypervisor, an indication that a particular USB device has been uncoupled from the host USB adapter;

disabling, by the hypervisor, all queue pairs associated with the particular USB device; and providing, by the hypervisor to each logical partition to which the particular USB device was assigned, an indication of the removal of the particular USB device.

19. The method of claim 1 further comprising:

identifying, by the hypervisor from information provided by the configuration manager, one or more previously undiscovered USB devices during USB device discovery; and subsequently, powering off the one or more previously undiscovered USB devices.

* * * * *